(12) United States Patent
Reutelingsperger (10) Patent No.: US 10,889,932 B2
(45) Date of Patent: Jan. 12, 2021

(54) METHOD FOR MANUFACTURING A LAMINATED TEXTILE PRODUCT, A PRIMARY BACKING FOR USE IN THIS METHOD AND A METHOD TO MANUFACTURE THIS PRIMARY BACKING

(71) Applicant: DSM IP ASSETS B.V., Heerlen (NL)

(72) Inventor: Chris Reutelingsperger, Echt (NL)

(73) Assignee: DSM IP ASSETS B.V., Heerlen (NL)

( * ) Notice: Subject to any disclaimer, the term of this patent is extended or adjusted under 35 U.S.C. 154(b) by 391 days.

(21) Appl. No.: 15/549,461

(22) PCT Filed: Feb. 8, 2016

(86) PCT No.: PCT/EP2016/052643
§ 371 (c)(1),
(2) Date: Aug. 8, 2017

(87) PCT Pub. No.: WO2016/128360
PCT Pub. Date: Aug. 18, 2016

(65) Prior Publication Data
US 2018/0030632 A1 Feb. 1, 2018

(30) Foreign Application Priority Data
Feb. 9, 2015 (EP) .................................. 15154347

(51) Int. Cl.
*D05C 17/02* (2006.01)
*D06N 7/00* (2006.01)
(Continued)

(52) U.S. Cl.
CPC ............ *D05C 17/023* (2013.01); *B32B 5/022* (2013.01); *B32B 5/024* (2013.01); *B32B 5/06* (2013.01);
(Continued)

(58) Field of Classification Search
CPC . Y10T 428/239; A47G 27/02; B32B 2471/00; B32B 2471/02; B32B 2471/04;
(Continued)

(56) References Cited

U.S. PATENT DOCUMENTS 3,325,323 A * 6/1967 Forkner ................... D04H 1/54
156/72
3,595,731 A * 7/1971 Davies et al. .......... D04H 1/485
428/151
(Continued)

FOREIGN PATENT DOCUMENTS

DE         195 06 845         8/1996
DE         19506845 A1 * 8/1996 ............. D05C 17/02
(Continued)

OTHER PUBLICATIONS

International Search Report and Written Opinion of the ISA for PCT/EP2016/052643 dated Apr. 7, 2016, 17 pages.

*Primary Examiner* — Jennifer A Steele
(74) *Attorney, Agent, or Firm* — Nixon & Vanderhye P.C.

(57) ABSTRACT

The invention pertains to a method for manufacturing a textile product comprising providing a first sheet having a front surface and a back surface, covering the back surface of the sheet with a porous layer having a porosity of 50% to 99%, the layer comprising a thermoplastic material, forming a pile on the front surface of first sheet by stitching one or more yarns through the first sheet, the one or more yarns having a free end that forms the said pile and a locked end that extends into the porous layer, thereby forming an intermediate product, processing the intermediate product by feeding this product along a body having a heated surface, the porous layer being pressed against the said heated surface, to melt at least a fraction of the thermoplastic material, cooling the molten fraction of the thermoplastic, thereby connecting the locked end of the one or more yarns (Continued)

to the first sheet, and optionally connecting a second sheet to the processed intermediate product, using an adhesive applied between the processed surface of the intermediate product and the second sheet. The invention also pertains to a primary backing for use in this method and to a method for manufacturing this primary backing.

19 Claims, 4 Drawing Sheets

(51) Int. Cl.
    *B32B 37/00*      (2006.01)
    *B32B 37/20*      (2006.01)
    *B32B 37/12*      (2006.01)
    *B32B 38/00*      (2006.01)
    *B32B 5/02*      (2006.01)
    *B32B 5/06*      (2006.01)
    *B32B 5/26*      (2006.01)
    *D04H 1/498*      (2012.01)
    *B32B 7/12*      (2006.01)
    *D04H 11/08*      (2006.01)
    *D03D 15/00*      (2006.01)

(52) U.S. Cl.
    CPC ................. *B32B 5/26* (2013.01); *B32B 7/12* (2013.01); *B32B 37/00* (2013.01); *B32B 37/1207* (2013.01); *B32B 37/203* (2013.01); *D03D 15/00* (2013.01); *D03D 15/0088* (2013.01); *D04H 1/498* (2013.01); *D04H 11/08* (2013.01); *D06N 7/0076* (2013.01); *D06N 7/0081* (2013.01); *B32B 2037/1215* (2013.01); *B32B 2038/008* (2013.01); *B32B 2255/26* (2013.01); *B32B 2262/02* (2013.01); *B32B 2262/0261* (2013.01); *B32B 2262/0276* (2013.01); *B32B 2262/106* (2013.01); *B32B 2471/02* (2013.01)

(58) Field of Classification Search
    CPC . D03D 27/00; D04B 1/02; D04B 7/12; D04B 9/12; D04B 11/08; D04B 21/02; D04B 23/08; D04B 25/08; D05C 17/02; D10B 2503/04
    See application file for complete search history.

(56) References Cited

U.S. PATENT DOCUMENTS

| | | | |
|---|---|---|---|
| 3,955,022 A | 5/1976 | Sands | |
| 4,053,668 A | 10/1977 | Kimmel et al. | |
| 4,069,361 A | 1/1978 | Kumar | |
| 4,294,876 A * | 10/1981 | Camden | B32B 5/06 428/95 |
| 7,364,634 B1 * | 4/2008 | Irwin, Sr. | B32B 37/203 156/308.2 |
| 2002/0132084 A1 * | 9/2002 | Fink | B29B 17/00 428/85 |
| 2006/0090650 A1 * | 5/2006 | Yamakawa | B01D 67/0009 96/11 |
| 2014/0272262 A1 * | 9/2014 | Williams | B29B 17/0036 428/95 |

FOREIGN PATENT DOCUMENTS

| | | |
|---|---|---|
| DE | 20 2011 105370 | 11/2011 |
| EP | 1 598 476 | 11/2005 |
| WO | WO 96/29460 | 9/1996 |
| WO | WO 2012/076348 | 6/2012 |
| WO | WO 2013/158398 | 10/2013 |
| WO | WO 2014/198731 | 12/2014 |

* cited by examiner

METHOD FOR MANUFACTURING A LAMINATED TEXTILE PRODUCT, A PRIMARY BACKING FOR USE IN THIS METHOD AND A METHOD TO MANUFACTURE THIS PRIMARY BACKING

This application is the U.S. national phase of International Application No. PCT/EP2016/052643 filed Feb. 8, 2016 which designated the U.S. and claims priority to EP Patent Application No. 15154347.7 filed Feb. 9, 2015, the entire contents of each of which are hereby incorporated by reference.

GENERAL FIELD OF THE INVENTION

The present invention pertains to a method for manufacturing a textile product comprising providing a first sheet having a front surface and a back surface, this sheet usually being called the primary backing, forming a pile on the front surface of this sheet by stitching one or more yarns through the first sheet, the one or more yarns having a free end that forms the said pile and a locked end that is stitched into the primary backing, thereby forming an intermediate product, processing the intermediate product by feeding this product along a body having a heated surface, the back of the product being contacted with (e.g. pressed against) the said heated surface, to at least partly melt the locked ends of the one or more yarns in order to provide a connection with the first sheet after solidification of the molten fraction of the locked ends, and optionally connecting a second sheet to the processed intermediate product, using an adhesive applied between the processed surface of the intermediate product and the second sheet. The invention also pertains to a primary backing for use in this method and to a method for manufacturing this primary backing.

BACKGROUND OF THE INVENTION

A method as described here above is known from EP 1598476 (assigned to Klieverik). This patent describes a method for connecting yarns to a primary backing, wherein no latex is used to anchor the yarns. The backing comprises a sheet wherein multiple thermoplastic yarns are stitched through the thickness of the sheet, form loops at the back surface and protrude from its upper surface to form a pile thereon. This process is called tufting. In an alternative embodiment, weaving could have been applied, which means that in effect a whole length of the product (or even the whole product) can be stitched using only one yarn. In the intermediate product formed this way the yarns are not yet durably connected to the primary backing: they can be easily removed by exerting a light pulling force on the yarns. In order to durably connect the yarns to the primary backing, the intermediate product is fed (pile upwards) along a heated roller surface and its underside is pressed against the roller so the yarns will at least partly melt. It is stated in EP 1598476 that after cooling and solidification, the yarns are firmly anchored to each other and the backing without the need for a latex polymer to provide sufficient mechanical anchoring of the yarns. One embodiment teaches that a thermoplastic adhesive (such as hot melt adhesive) may be applied additionally as a powder to the underside of the backing, so the heated surface melts the yarns and adhesive together to create a good adhesion between the piles, the adhesive and the backing. In another embodiment pressure may be applied after heating (e.g. by a pressure roller) to the backing and piles in a direction perpendicular to the backing surface (i.e. from below) to smear the plasticised yarns together to enhance their mutual adhesion, thus allowing the heated roller to be held at a lower temperature, below the temperature at which the yarns would fuse by heat alone. This method provides the advantage that the intermediate backing can be easily recycled as the yarns and backing sheet can be made from the same polymer. There is no incompatible latex penetrated into the yarn piles. There is also saving in energy and raw material costs compared to prior art methods. However, this method still has some disadvantages. If the additional adhesive is not used, the yarns are still insufficiently strongly anchored to the backing for use in high load applications, for example for use as carpet in the interior of cars, trains, planes, offices, shops etc. Thus, in practise to make a textile product from the intermediate backings described in EP 1598476 it will still be necessary to apply an additional adhesive or latex to the underside of the backing to extensively impregnate the piles and backing to provide sufficient mechanical anchorage.

WO 2012/076348 (assigned to Niaga) describes another method for making textile products wherein heat and pressure are used to at least partly melt the yarns at the back of the first sheet and spread the molten material to provide a good mechanical anchoring. Though in theory with the use of this method an additional secondary support layer (the second sheet) may no longer be necessary, this document does teach that such a support layer may still be useful, in particular when a reactive adhesive is being used to connect the second sheet to the first sheet. Such a reactive adhesive relies on thermally reversible reactions between reactive molecules present at the interface between the first sheet and the second sheet. Reactive adhesives provide a much stronger bond than is typically achieved by other types of adhesives such as hot melt adhesives (HMA). However, whilst use of reactive adhesive provides a strong bond and can be easy recycled (unlike the latex), its use still leads to a textile product that does not have optimal mechanical properties. A further disadvantage of using a chemically reactive adhesive is that both the components to be joined and the adhesive must carry co-reactive groups. Thus the polymer used to prepare the primary backing and/or tufts is likely to require chemical modification in an additional step, as standard commercial polymers may not contain the required functional groups to be suitable for use with reactive adhesives.

WO96/29460 discloses a tufted carpet comprising pile face yarns, a backing fabric and an adhesive binder free of latex materials. This binder comprises a thermoplastic fabric which melts to secure the pile to the backing.

OBJECT OF THE INVENTION

It is object of the invention to provide an improved method to manufacture a textile product, wherein the yarns are mechanically durably bonded to the primary backing.

SUMMARY OF THE INVENTION

In order to meet the object of the invention, a method according to the GENERAL FIELD OF THE INVENTION section has been devised, wherein before the melting process is applied, the back surface of the sheet is covered with a porous layer having a porosity of 50% to 99% (i.e. above 50 but below 100%, having any value of between 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98 and 99%), the porous layer comprising a thermoplastic material, melting at least a fraction of this thermoplastic material, and cooling the molten fraction of the thermoplastic material, thereby connecting the locked end of the one or more yarns to the first sheet.

By covering the back surface of the first sheet with such a porous layer (e.g. by laying a sheet of such a porous layer on the back surface, or by in situ constituting such a porous layer on the back surface) it was found that a very durable bond between the yarns and the primary backing can be obtained. Most probably this is due to the fact that the thermoplastic material comprised in the porous layer (evenly distributed), after at least partly melting and subsequent cooling (to re-harden the melted material) forms an additional locking means in the form of a (semi-) continuous layer that grabs around the ends of the yarns. Indeed, although in WO 2012/076348 co-melting of the primary backing is described as an improved method for connecting the yarns, this is described as a co-melting of the (regular) primary backing. Such a regular primary backing is typically a very dense material, since it has to provide mechanical stability. Such a dense material, having a typical porosity between 10 and 30%, is not easily melted to an extent that its molten fraction easily flows and mingles with the yarns. A porous layer has voids such that the thermoplastic material is present in a fluffy (non-dense) way and thus is easily melted by contact with a hot body. Moreover, due to the high content of voids in the layer, the melted fraction easily mingles around the ends of the yarns. This appears to provide for a highly durable connection of the locked ends of the yarns to the first sheet. The advantage over the addition of a powdered hot melt adhesive as described in EP 1598476 is that the porous layer is (semi-)continuous and thus, there is an inherent mechanical strength in the length and width direction of the layer. When a powdered hot melt adhesive is used as proposed in EP 1598476, the grains of hot melt adhesive (inherently discontinuous) can only provide for a local bonding of the yarns. Only when the adhesive would be completely molten and spread as a continuous layer, there could be a mechanical strength in the length and width direction of the product. To provide for such a continuous layer with a thin layer of adhesive on an uneven surface of a primary backing is not possible in practice. The current method however provides for such a continuous layer in a very easy and effective way. The thermoplastic material, evenly distributed in the porous layer (about the same amount per square cm), may be present in amount of between 1 and 100% (in mass), the amount depending i.a. on its melting characteristics and its strength after solidification. It is practical however to have an amount above 10%, 20%, 30%, 40%, 50%, 60%, 70%, 80% or even above 90%.

It is noted that according to the invention, the porous layer can be provided on the first sheet before the yarns are applied into this sheet, but it may also be advantageous to firstly stitch the yarns in the first sheet and then apply the porous layer. The first embodiment however has the advantages that the primary backing with the porous layer can be produced off-line as a laminate and also, that it is easier to devise a practical process wherein the locked ends of the yarns extend actually into the porous layer.

The invention also pertains to a primary backing for use in producing a laminated textile product, wherein the backing comprising a mechanically stable first sheet, and connected to a surface of this sheet a porous layer having a porosity of 50% to 99%, the layer comprising a thermoplastic material. The invention also pertains to a method to manufacture a primary backing for use in producing a laminated textile product, the method comprising providing a mechanically stable sheet, covering a surface of the sheet with a porous layer having a porosity of 50% to 99%, the layer comprising a thermoplastic material, and connecting the porous layer to the sheet.

DEFINITIONS

A laminate is a structure comprising multiple stacked layers mechanically connected to each other.

A sheet is a substantially two dimensional mass or material, i.e. broad and thin, typically, but not necessarily, rectangular in form.

A layer is a sheet, but, as opposed to a sheet, a layer may have a low intrinsic mechanical stability under tensile stress (cf: a layer of cotton wool is a two-dimensional sheet of cotton fibres but may be torn apart under tensile stress).

A thermoplastic material is a material that softens or melts when heated and hardens when cooled. Typically, thermoplastic materials comprise thermoplastic polymers, consisting of polymer molecules that are not or only scarcely linked to each other, i.e. they have no, or almost no cross-links. Thermoplastic materials include polyethylene, polypropylene, polystyrene, polyester, polyvinyl chloride, acrylics, polyamides, polyurethanes and cellulosics.

Fibrous means consisting basically out of fibres. "Basically" means that the basic mechanical constitution is arranged out of fibres: the fibres may however be impregnated or otherwise treated or combined with a non-fibrous material such that the end material also comprises other constituents than fibres. Typical fibrous sheets are woven and non-woven textile products, or combinations thereof.

Porosity is a measure of the void (i.e. "empty") spaces in a material, and is a fraction of the volume of voids over the total volume, between 0 and 1, or as a percentage between 0 and 100%.

Stitching is a method of mechanically making a yarn part of an object by stitches or as if with stitches, such as by tufting, knitting, sewing, weaving etc.

A felted layer is a layer of non-woven separate fibres which are matted together using mechanical impact, optionally using heat and moist.

Needle felting is a method of felting wherein (one or more) needles are used to grab the top layer of fibres in a fleece and tangle them with the inner layers of fibres by having the needles enter the fleece. Typically, multiple actions of the needles are used to produce the ultimate felted product. While erroneously referred to as "barbed" needles, the needles in fact have notches along the shaft of the needle that grab the fibres. Since these notches face down towards the tip of the needle, they do not pull the fibres out as the needle exits the fleece.

A hot melt adhesive is a thermoplastic adhesive that is designed to be melted, i.e. heated to transform from a solid state into a liquid state to adhere materials after solidification. Hot melt adhesives are typically non-reactive, crystalline and comprise low or no amount of solvents so curing and drying are typically not necessary in order to provide adequate adhesion.

EMBODIMENTS OF THE INVENTION

In a first embodiment of the method according to the invention the locked ends of the yarns at least partly co-melt with the thermoplastic material. By at least partly co-melting with the thermoplastic material, a stronger bond can be created between the (ultimately) solidified thermoplastic material and the yarns, and hence between the first sheet and the yarns. In particular, only a surface fraction of the yarns is melted, enough to secure some mixing with the molten fraction of the thermoplastic material, but not so much that the locked end of the yarn will completely melt and thereby "dissolve" in the porous layer. In this embodiment, the difference between the respective melting temperatures of the yarn material and the thermoplastic material in the porous layer preferably is 20° C. or lower, for example 19, 18, 17, 16, 15, 14, 13, 12, 11, 10, 9, 8, 7, 6, 5, 4, 3, 2, 1° C. or even the same. At a small melting temperature difference, the melting method is easier to implement.

In a second embodiment of the method according to the invention, the porous layer has a porosity of at least 90%. It appears that a porosity of at least 90% provides for a very easy-to-melt thermoplastic material, while still maintaining the required mechanical connection in this layer (importantly, in the length and width direction of this layer). Indeed, the ultimate mechanical strength in the layer will depend i.a. on the other materials present in the layer (if any), the amount of melting (which can be any value between 0 and 100%, typically between 10 and 90%) and the type of thermoplastic material. Depending on the required extra bonding strength associated with the use of the porous layer according to the invention, an adequate amount of melting and type of material can be found through routine experimentation.

In another embodiment the locked ends of the one or more yarns extend completely trough the porous layer, optionally forming one or more loops that run over the porous layer. By having the locked ends extending completely through the porous layer, there will be a very good entanglement of the at least partly molten yarns with the at least partly molten material of present in the porous layer. As stated, the locked ends optionally form loops that run over the porous layer. In this embodiment it is needed that before the yarns are applied into the first sheet, the porous layer is already provided on this first sheet. This means that the porous layer thus is in fact integrated with the primary backing thereby forming a dual layer primary backing. This way, when the yarns are stitched into this dual layer primary backing, the yarns may be able to form loops that run actually over the porous layer. This appears to provide for even a further improved bonding strength.

In yet another embodiment the porous layer is a non woven layer. A non woven layer has the advantage that it is homogenous, or at least near homogenous (as opposed to a woven layer that has substantially different properties in different directions). In the present invention such homogeneity is very advantageous since it provides the additional bonding strength more or less independent from the direction of use of the ultimate textile product.

In still another embodiment the porous layer is a fibrous layer. A fibrous layer, such as for example a fleece-like layer, can be provided easily as a porous layer, being homogenous in any direction, being very high in voids (up to 99%) and still have sufficient mechanical strength in its length and width direction. This is due to the fact that the fibres may mechanically entangle and thus, even when the porosity is up to 99%, still have sufficient mechanical strength. In a further embodiment, the porous layer is a felted layer, optionally a needle felted layer.

In yet a further embodiment wherein the porous layer is a fibrous layer, the porous layer in essence consists of fibres having a length shorter than 10 cm, typically larger than 0.1 cm, preferably between 1 and 7 cm. It was found that when the fibres are longer than 10 cm, it is less easy to provide a thin and homogenous porous layer. Below 0.1 cm there is very little to no inter-fibre entanglement and little length available for interweaving of the fibres with the primary backing. Although feasible, using fibres shorter than 1 cm leads to less mechanical entanglement in the length and width direction of the layer. Typically fibres between 1 and 7 cm are used, wherein fibres between 3 and 6 cm, such as 4 and 5 cm, are preferred since they are easier to assemble into a fleece.

In still a further embodiment the porous layer comprises fibres having a weight of between 2 and 12 dTex, i.e. having a weight between 2 and 12 mg per 10 meters of length. For the pile of textile products such as carpets, typically yarns are being used having a weight above 12 dTex, such as for example between 20 and 40 dTex. However, for the current porous layer it was found that fibres having a lower weight than what is common in the art are advantageously used. The reason for this is that these very thin fibres more easily melt and appear to form a more even layer of molten material that serves as an extra binding layer for the yarns and at the same time, at those locations where no yarns are present (e.g. depending on the type of yarn pattern, in between rows of yarns), form a anchoring layer for an optional secondary backing. The reason for this additional anchoring effect is not clear, but may lead to improved laminating properties.

In again another embodiment the porous layer further comprises carbon fibres, typically between 0.1 and 1 mass percent. Applicant realised that when using a fibrous porous layer, in particular a felted layer, it is easy to additionally incorporate carbon fibres in the layer. Such fibres may provide that the textile product can conduct electrical current to at least some extent, such that static charging of the textile product (which is often encountered as a practical problem of many textile products) can be prevented or at least strongly diminished.

In still again another embodiment the porous layer contains fibres chosen from the group consisting of polyalkylene fibres, polyester fibres and polyamide fibres. Applicant recognised that recycling of the end product will be easier of the porous layer is made of the same type of material as the yarns and/or first sheet.

In another embodiment the porous layer has a thickness of between 0.1 to 5 mm. It appears that with a thickness of between 0.1 and 5 mm, enough solid material can be provided in the porous layer to obtain the advantages of the present invention. In general, the thicker the layer, the higher the porosity may be, although this may depend i.a. on the type of material (melting temperature) and the thickness of the continuous lines (i.e. the actual material, for example the fibres) in the porous layer.

In yet another embodiment the first sheet is a woven fabric. A woven fabric has several advantages over non-woven fabrics, namely that it is strong and relatively inexpensive. A big disadvantage of a woven primary backing is that the when the backing is cut, its sides may ravel and become frayed. That is why for many high end applications such as carpet tiles, carpet for hotels, airplanes and other non-domestic applications, the primary backing is a non-woven materials such as Colback® (available from Bonar, Arnhem, The Netherlands). However, such non-woven primary backings are relatively expensive and therefore mainly applied in high end products. With the current invention however, ravelling of the woven primary backing may be prevented due to the (partly) molten porous layer on top of and connected to the woven backing. This (partly) molten layer keeps the integrity of the woven in tact, even when the ultimate textile product is cut through. In a further embodiment the first sheet is a fabric woven from polymer tape. Such fabrics are very inexpensive to make, and in combination with the (partly) molten porous layer, do not (or hardly) suffer from the problem of ravelling.

In still another embodiment during processing of the intermediate product, the intermediate product has a relative speed (not being zero) with respect to the heated surface. In this embodiment the molten fraction of the yarns and porous layer is spread in a direction parallel to the surfaces of the first sheet by imparting a mechanical force on the molten fraction in the said direction. This mechanical force may lead to a calendering process, virtually uniting the yarn ends and the porous layer at the back of the intermediate product into one continuous and smooth layer of material.

In another embodiment the adhesive used for connecting the second sheet to the processed intermediate product is a hot melt adhesive. A hot melt adhesive, due to its crystalline properties, is relatively brittle when cold. As such, it was expected that the local deformation of the intermediate product would lead to breakage of the adhesive and hence delamination. This does not appear to be the case. In a further embodiment the hot melt adhesive comprises at least 50% by weight of a polymer chosen from the group consisting of polyurethane(s), polycarbonate(s), polyester(s), polyamide(s), poly(ester-amide(s)), mixtures thereof and/or copolymers thereof. This provides for example the option to choose an adhesive of the same type of polymer as used for constituting the sheets. This may help when recycling the textile product.

It is noted that any of the above features of the embodiments of the method according to the invention, as far as they pertain to the primary backing itself (thus optionally the first sheet integrated with the porous layer), can also be advantageously applied in the primary backing according to the invention, or the method to manufacture a primary backing for use in producing a laminated textile product. In particular, a primary backing wherein the first sheet is woven from polymer tape is highly advantageous for use in the manufacture of a textile product since this backing is easy to produce, relatively inexpensive and, due to the porous layer, does not need to suffer from the prior art disadvantage of fraying.

The invention will now be explained in more detail using the following non limiting examples.

EXAMPLES

FIG. 1

Figure 1:
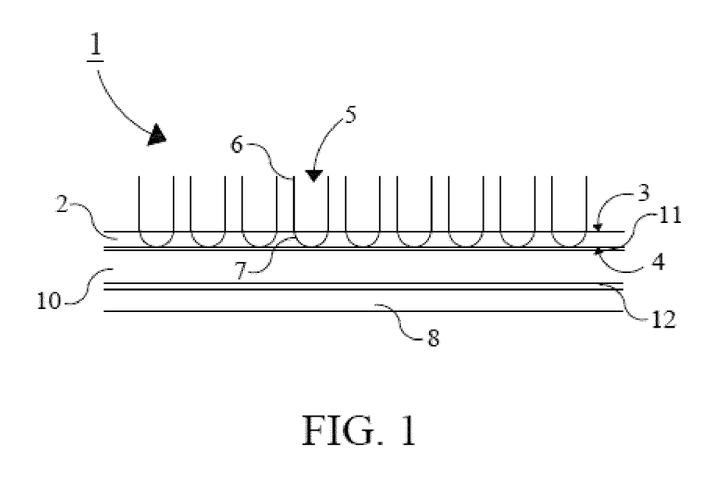
FIG. 1 schematically shows a cross section of a prior art textile product

FIG. 1 schematically shows a cross section of a prior art textile product, in this case a carpet tile. The tile comprises a first sheet 2, the so called primary backing, which is a strong nonwoven sealed nylon obtained from Shaw Industries, Dalton USA. Nylon yarns 5 are tufted into this primary backing, extend with their end 7 through this backing and form loops over its back surface 4. This way the ends 7 are locked into the primary backing. The free ends 6 of yarns 5 extend from the first surface 3 of the sheet to form a pile thereon. The yarns 5 are mechanically durably connected to the primary backing by sealing the locked ends 7 to the second surface 4 of the sheet using the fibre binding method as described with reference to FIG. 3. The weight of this first sheet is 670 g per m2. In order to provide mechanical stability, the tile 1 comprises a second sheet 8, in this case a backing of a polyester needle felt backing fleece obtained as Qualitex Nadelvlies from TWE, Emsdetten, Germany. The weight of this second sheet is about 800 g/m2. In between the first and second sheet is a resilient layer 10, in this case a polyester expansion fleece having a weight of 330 g/m2, which is obtained from TWE as Abstandsvliesstof, a non-woven fabric which has not been needle-punched. Both sides of this layer 10 are constructed of a mesh of 100% PET which has been mechanically solidified. The thickness of this intermediate layer is about 4 mm. The three layers (first and second sheet and intermediate layer) are glued together using a polyester hot melt glue from DSM, Geleen, the Netherlands, applied as layers 11 and 12 at a weight of about 300 g/m2. The total weight of the carpet tile is thus about 2.4 kg/m2.

FIG. 2

Figure 2A:
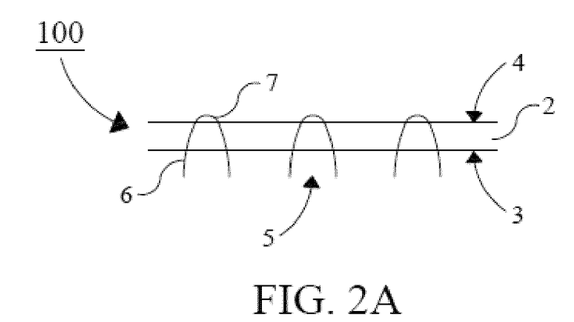
FIG. 2 schematically shows details of the product of FIG. 1
Figure 2B:
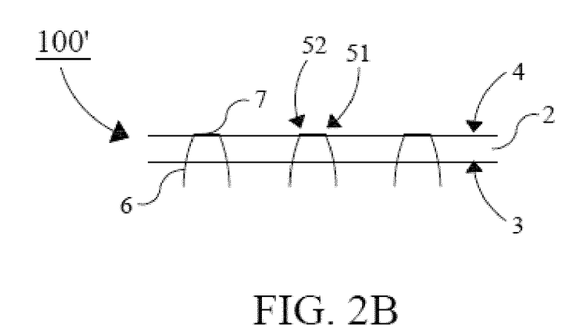

FIG. 2 schematically shows details of the product of FIG. 1 at various stages of manufacturing. FIG. 2 depicts the intermediate product 100, which consists of the primary backing 2 and yarns 5 tufted therein. As depicted, the locked ends 7 of the yarns 5 form loops at the back surface 4 of the primary backing. The free ends 6 extend from the front surface 3 of the primary backing. The yarns 5 can be easily removed from this intermediate product since the yarns are simply stitched into this backing. By applying a light pulling force by hand, each of the yarns can be easily removed from the primary backing. In order to durably connect the yarns to the primary backing a fibre-binding process is applied as known from WO 2012/076348, further elaborated upon in detail with reference to FIG. 3. In this process the back of the intermediate product 100 is dragged along a heated body in contact therewith, in order to at least partly melt the loops of the yarns and possibly also some of the material of the primary backing at its back surface, and at the same time to make the back surface smooth by forcing the molten material to spread a little bit over the back surface 4 of the primary backing. This results in a very flat and smooth layer wherein at least part of the material of the locked ends 7, as far as originally present in the loops and being molten, is more or less spread into a flat configuration onto the back surface 4 of the primary backing. The processed intermediate product 100' is depicted in FIG. 2B. It was found out that despite the melting and spreading action, yarns may still get pulled out of the processed product (and thus, out of the final textile product) when pulling forces are used that correspond to pulling forces exerted during normal to high load use of the textile product. Without being bound to theory, it is believed that this is due to a high tension build up at the positions 51 and 52 where the yarns come out of the primary backing. High tension build up may lead to breakage and hence, a free end of the yarn that is no longer secured at the back of the primary backing. Also, since it is difficult to control co-melting of the primary backing with the locked ends of the yarns (a substantial co-melting of the primary backing may lead to "over-melting" or possibly even burning of the yarn material, especially when high process speeds are used), it is often a necessity to refrain from co-melting of the primary backing. This worsens the strength with which the yarns are mechanically connected to the primary backing due to the fibre-binding process.

FIG. 3

Figure 3:
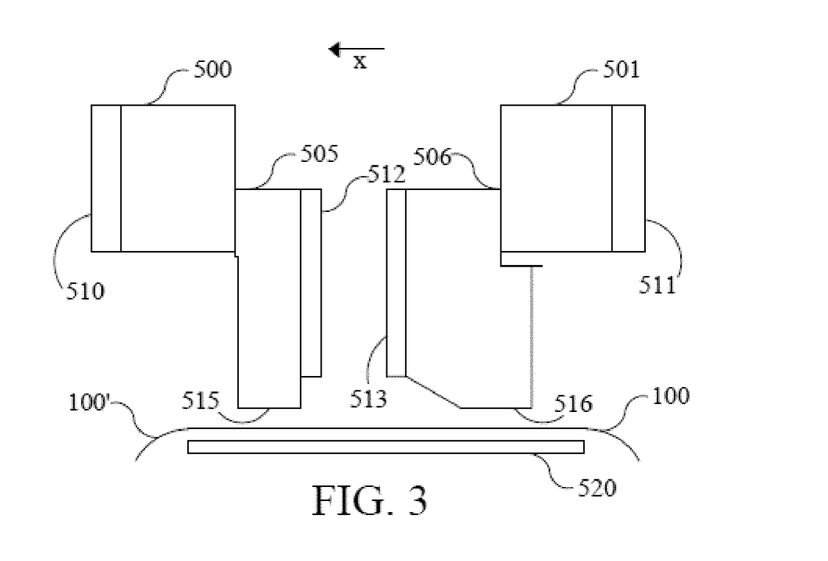
FIG. 3 schematically shows a configuration for applying a fibre-binding process

FIG. 3 schematically shows a configuration for applying a fibre-binding process, in this case a process derived from the basic process as known from WO 2012/076348. In the configuration shown in FIG. 3 a first heating block 500 and a second heating block 501 are present, in order to heat the heating elements, also denoted as heating blades or heating bodies, 505 and 506 respectively. These heating elements have a working surface 515 and 516 respectively, which surfaces are brought in contact with an intermediate product 100 to be processed, typically a primary backing to which yarns are applied via a stitching process such as tufting. The working surfaces both have a working width of 18 mm, and the intermediate distance is 26 mm. The back surface of the product is brought in contact with the working surfaces of the heating elements. In order to be able and apply adequate pressure for the product to be processed, a Teflon support 520 is present which is used to counteract a pushing force applied to the heating elements. In operation, the heating elements are moved relatively to the product in the indicated direction X. Typically, the heating elements are stationary and the intermediate product 100 product is forced to travel between the working surfaces and the Teflon support in a direction opposite to the direction indicated with X. The product 100 to be processed with the above described configuration consists of a first sheet (primary backing) provided with a cut pile of polymeric yarns, tufted into the sheet. The yarns typically have a melting temperature of about 260-280° C. This product is processed using a temperature of the first heating element of 200-220° C., in order to pre-heat the product. The second heating element is kept at a temperature about 15° C. above the melting temperature of the yarns. To keep the temperatures at the required level, the heating blocks and heating elements are provided with layers of insulating material 510, 511, 512 and 513 respectively. The product is supplied at a speed of 12 mm per second (0.72 metre per minute) or higher, and the pressure applied with the heating elements is about 1.35 Newton per square centimetre. This results in a product 100' having a calendered back surface, i.e. being smooth and glossy at the sites where the stitched yarns extend from the back surface.

FIG. 4

Figure 4:
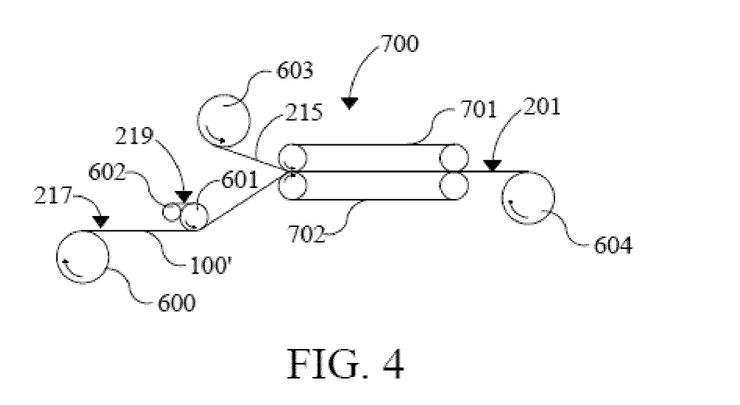
FIG. 4 schematically shows a laminating configuration

FIG. 4 schematically shows a laminating configuration for applying a second sheet, in this case a dimensionally stable secondary backing sheet to the back of the first sheet that is produced with a method as described in conjunction with FIG. 3. In this figure a first roller 600 is depicted on to which roller is wound a 2 metre wide web of the processed intermediate product 100' made according to the method described in conjunction with FIG. 3. The product is unwound from the roller 600 to have its back-side 217 to come into contact with a second roller 601. This roller is provided to apply a layer of hot melt adhesive (HMA) 219 to the back side 217. For this, a bulk amount of HMA 219 is present and heated between the rollers 601 and 602. The thickness of this layer can be adjusted by adjusting the gap between these two rollers. Downstream of the site of HMA application is the secondary backing 215, which backing is unwound from roller 603. This secondary backing is pressed against the hot and tacky adhesive and cooled in the unit 700. This unit consists of two belts 701 and 702 which on the one hand press the secondary backing 215 against the primary product 100', and on the other hand cools down the adhesive to below its solidification temperature. The resulting end product 201 is thereafter wound on roller 604. In an alternative embodiment the fibre-binding process as described in relation with FIG. 3 and the lamination process take place in line. In that case, the fibre-binding set-up as shown in FIG. 3 could be placed between roller 600 and roller 601. In that case, intermediate product 100 is wound of the roller 600 and fed along the rest of the process steps.

Typically the primary backing material itself is chosen to be of a material that has a melting temperature far above that of the yarns, so that the backing itself remains completely unaffected by the melting process if desired. This provides the advantage that a primary backing may be used that is more dimensionally stable at the high process temperature used for fibre-binding, but has the disadvantage that the fibre-binding process leads to less firmly bonded yarns. This problem is solved by using the present invention as is explained with reference to FIG. 5.

FIG. 5

Figure 5A:
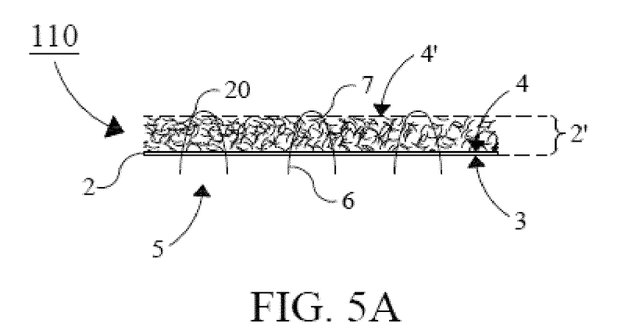
FIG. 5 schematically shows a cross section of a textile product according to the invention Example 1 provides test results with a textile product according to the invention

FIG. 5 schematically shows a cross section of a textile product according to the invention. This figure corresponds to FIG. 2. In FIG. 5A a first sheet 2 is depicted having a front surface 3 and a back surface 4. This sheet is made from woven polymer tape. The warp yarns, made of a 1.0 mm wide polyester tape of 42 Tex, are woven at 112 yarns per 10 cm. The weft yarns, made of a 2.0 mm wide polyester tape of 86 Tex, are woven at 59 yarns per 10 cm. This results in a mechanically strong sheet, having a very low weight of about 100 g/m$^2$ and is inexpensive to produce. As recognised in the prior art, the downside of such a sheet woven from polymer tape is that the sheet is prone to fraying. The back surface 4 of this sheet is covered with a porous layer 20, in this case a felted fibrous layer. This layer is made by covering the back surface of the sheet 2 with 5 dTex fibres having a length of about 50 mm, 70% of the fibres being of polyamide ($T_m$, about 220° C.) and 30% of the fibres being of a low melting polyester ($T_m$, about 230° C.). The fibres are provided in an amount of about 45 g/m$^2$. This layer is needle-felted to the first sheet, thereby forming a new dual layer primary backing 2'. The needle felting process is stopped when a final thickness (for the porous layer) of about 2 mm is reached. The resulting porosity in this layer is about 98%. Using different mixtures of fibres, different starting weights (typically between 30 and 70 g/m2), and different needle-felting processes (different number of needles per m$^2$, different felting times etc.), porous layers having a porosity between 90 and 99%, typically above 95%, can be made.

Figure 5B:
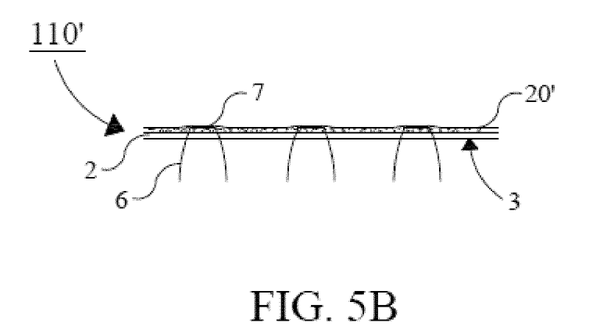

As depicted in FIG. 5A the yarns 5, in this case of polyamide, are tufted into the primary backing 2' such that the locked ends 7 form loops that run over the back surface 4' of the porous layer 20 (which now in effect is the back surface of the new primary backing 2'), thereby forming intermediate product 110. This product is subjected to the fibre-binding process as described with reference to FIG. 3. The result of this is schematically depicted in FIG. 5B. The porous layer has partly melted, together with a part of the locked ends 7 of the yarn 5, and forms a thin layer 20' of partly molten and compressed fleece, having the ends of the yarns securely locked therein. This layer can best be compared to glass-fibre strengthened resin: a more or less continuous layer, provided with entangled fibres, including the ends of the yarns in its mass. This way, the yarns 5 in the processed intermediate product 110', appear to be better bonded to the primary backing when compared with the bonding as obtained without the porous layer (see FIG. 2).

Another advantage of this constitution is that the layer 20' prevents that the primary backing frays when being cut through.

Example 1

This example provides test results for comparing a textile product incorporating the present invention versus a textile product not incorporating the present invention. Both textile products are based on a primary backing of woven polyester tape, and Nylon yarns tufted therein as described in conjunction with FIG. 5. The textile product according to the invention has the additional porous layer as described in conjunction with FIG. 5. In order to provide mechanical stability, both textile products are provided with a secondary backing, in this case a polyester needle felt backing fleece obtained as Qualitex Nadelvlies from TWE, Emsdetten, Germany, having a weight of about 500 g/m$^2$. The two layers are glued together using a polyester hot melt glue from DSM, Geleen, the Netherlands, at a weight of about 300 g/m$^2$.

The textile products were firstly subjected to a tuft bind test according to ASTM D1335-12 ("Standard Test Method for Tuft Bind of Pile Yarn Floor Coverings"). The resulting tuft bind was 24.9 N for the textile product incorporating the porous layer and 17.9 N for the textile product without the porous layer. Apparently the yarns obtain a better anchoring in the primary backing due to the presence of the porous layer in line with the present invention.

After that, the products were subjected to a delamination test according to ASTM D3969-05 ("Standard Test Method for Resistance to Delamination of the Secondary backing of Pile Yarn Floor Covering"). It appeared that the delamination strength for the textile product incorporating the porous layer according to the invention was 80-100 N, with peaks between 124-138 N. For the textile product without the porous layer these figures were 20 N and 32-52 N respectively, which is considerably lower. The reason for the improvement in delamination strength is not 100% clear, but might be due to the better anchoring of the tuft yarns in the primary backing.

The invention claimed is:

1. A method for manufacturing a textile product comprising:
   (a) providing a first sheet having a front surface and a back surface,
   (b) covering the back surface of the sheet with a porous layer having a porosity of 50% to 99%, the layer comprising a thermoplastic material,
   (c) forming a pile on the front surface of first sheet by stitching one or more yarns through the first sheet, the one or more yarns having free ends that form the pile and locked ends that extend into the porous layer, thereby forming an intermediate product,
   (d) processing the intermediate product by feeding the intermediate product along a body having a heated surface and contacting the porous layer with the heated surface to thereby melt at least a fraction of the thermoplastic material, to thereby form a compressed layer of thermoplastic mat and the locked ends of the one or more yarns on the back surface of the first sheet
   (e) cooling the molten fraction of the thermoplastic material, thereby connecting the locked ends of the one or more yarns to the first sheet,
   (f) optionally connecting a second sheet to the processed intermediate product, using an adhesive applied between the processed surface of the intermediate product and the second sheet.

2. The method according to claim 1, wherein the locked ends of the yarns at least partly co-melt with the thermoplastic material.

3. The method according to claim 1, wherein the porous layer has a porosity of at least 90%.

4. The method according to claim 1, wherein the locked ends of the one or more yarns extend completely through the porous layer, optionally forming one or more loops that run over the porous layer.

5. The method according to claim 1, wherein the porous layer is a non-woven layer.

6. The method according to claim 1, wherein the porous layer is a fibrous layer.

7. The method according to claim 6, wherein the porous layer is a felted layer.

8. The method according to claim 7, wherein the porous layer is a needle felted layer.

9. The method according to claim 6, wherein the porous layer consists essentially of fibres having a length shorter than 10 cm.

10. The method according to claim 6, wherein the porous layer comprises fibres having a weight of between 2 and 12 dTex.

11. The method according to claim 6, wherein the porous layer further comprises carbon fibres.

12. The method according to claim 6, wherein the porous layer contains fibres selected from the group consisting of polyalkylene fibres, polyester fibres and polyamide fibres.

13. The method according to claim 1, wherein the porous layer has a thickness of between 0.1 to 5 mm.

14. The method according to claim 1, wherein the first sheet is a woven fabric.

15. The method according to claim 14, wherein the first sheet is a fabric woven from polymer tape.

16. The method according to claim 1, wherein step (d) comprises feeding the intermediate product along the body at a relative speed with respect to the heated surface.

17. The method according to claim 1, wherein the adhesive is a hot melt adhesive.

18. The method according to claim 17, wherein the hot melt adhesive comprises at least 50% by weight of a polymer selected from the group consisting of polyurethane(s), polycarbonate(s), polyester(s), polyamide(s), poly(ester-amide(s)), mixtures thereof and/or copolymers thereof.

19. The method according to claim 6, wherein the porous layer consists essentially of fibres having a length between 1 and 7 cm.

* * * * *